US008152068B2

(12) United States Patent
Sanchez et al.

(10) Patent No.: US 8,152,068 B2
(45) Date of Patent: Apr. 10, 2012

(54) SYSTEMS AND METHODS FOR PRODUCING AND PROCESSING TIME DEPENDENT DYNAMIC BARCODES IN A MAIL DELIVERY SYSTEM

(75) Inventors: Luis A. Sanchez, Troy, NY (US); Douglas B. Quine, Bethel, CT (US)

(73) Assignee: Pitney Bowes Inc., Stamford, CT (US)

( * ) Notice: Subject to any disclaimer, the term of this patent is extended or adjusted under 35 U.S.C. 154(b) by 484 days.

(21) Appl. No.: 11/967,686

(22) Filed: Dec. 31, 2007

(65) Prior Publication Data
US 2009/0166438 A1 Jul. 2, 2009

(51) Int. Cl.
G06K 7/10 (2006.01)
G06K 7/14 (2006.01)
G06K 19/00 (2006.01)
G06K 19/06 (2006.01)
G06K 15/00 (2006.01)
G11B 5/09 (2006.01)
G11B 7/10 (2006.01)
G06F 17/00 (2006.01)
G07B 15/02 (2011.01)
G07B 17/02 (2006.01)
G06Q 20/00 (2012.01)

(52) U.S. Cl. ............ 235/462.01; 235/454; 235/462.18; 235/487; 235/491; 235/375; 235/378; 235/384; 235/385; 705/401; 705/60; 705/28; 705/29

(58) Field of Classification Search .............. 235/454, 235/462.18, 487, 491, 375, 378, 384, 385; 705/401, 60, 28, 29
See application file for complete search history.

(56) References Cited

U.S. PATENT DOCUMENTS

| | | | | |
|---|---|---|---|---|
| 3,662,181 A * | 5/1972 | Hercher et al. | ......... | 235/462.04 |
| 3,812,328 A * | 5/1974 | Tramposch | ............. | 235/487 |
| 4,212,153 A | 7/1980 | Kydonieus et al. | | |
| 4,256,493 A * | 3/1981 | Yokoyama et al. | ........ | 106/31.58 |
| 4,263,503 A * | 4/1981 | Bianco | ............. | 235/487 |
| 4,775,786 A * | 10/1988 | Yamano et al. | ............. | 235/490 |
| 4,780,835 A * | 10/1988 | Sievel et al. | ............. | 705/408 |
| 4,879,166 A * | 11/1989 | Misuda et al. | ............. | 428/212 |
| 5,017,226 A * | 5/1991 | Kulisz | ............. | 106/31.17 |
| 5,058,088 A * | 10/1991 | Haas et al. | ............. | 368/327 |
| 5,058,925 A * | 10/1991 | Dotson | ............. | 283/95 |
| 5,096,813 A * | 3/1992 | Krumhar et al. | ............. | 435/28 |
| 5,128,527 A * | 7/1992 | Kawai et al. | ............. | 235/462.07 |
| 5,292,018 A * | 3/1994 | Travisano | ............. | 215/246 |
| 5,457,307 A * | 10/1995 | Dumont | ............. | 235/383 |
| 5,506,943 A * | 4/1996 | Furukawa | ............. | 358/1.14 |
| 5,513,264 A * | 4/1996 | Wang et al. | ............. | 380/51 |
| 5,521,371 A * | 5/1996 | Hotta et al. | ............. | 235/487 |
| 5,633,835 A * | 5/1997 | Haas et al. | ............. | 368/327 |
| 5,839,592 A * | 11/1998 | Hayes | ............. | 215/230 |
| 5,902,982 A * | 5/1999 | Lappe | ............. | 235/375 |

(Continued)

OTHER PUBLICATIONS

TEMPbadge Identification Products—Expiring ONEstep TIMEbadge.

(Continued)

*Primary Examiner* — Daniel Walsh
(74) *Attorney, Agent, or Firm* — George M. Macdonald; Charles R. Malandra, Jr.; Steven J. Shapiro

(57) ABSTRACT

Systems and methods for utilizing time-dependent dynamic barcodes in systems including a mail delivery system for manipulating delivery charges and/or sorting and delivery processing preferences are described.

17 Claims, 12 Drawing Sheets

U.S. PATENT DOCUMENTS

| | | | |
|---|---|---|---|
| 5,939,699 A * | 8/1999 | Perttunen et al. | 235/462.01 |
| 5,957,458 A | 9/1999 | Haas et al. | |
| 6,009,400 A * | 12/1999 | Blackman | 705/303 |
| 6,223,988 B1 * | 5/2001 | Batterman et al. | 235/472.01 |
| 6,685,094 B2 * | 2/2004 | Cameron | 235/468 |
| 6,703,245 B2 * | 3/2004 | Sumitani et al. | 436/136 |
| 6,731,786 B2 | 5/2004 | Jones et al. | |
| 6,752,430 B2 * | 6/2004 | Holt et al. | 283/72 |
| 6,795,376 B2 * | 9/2004 | Quine | 368/10 |
| 7,036,452 B1 * | 5/2006 | Tester | 116/207 |
| 7,157,048 B2 * | 1/2007 | Goldsmith et al. | 422/400 |
| 7,335,899 B2 * | 2/2008 | Blanton et al. | 250/474.1 |
| 7,562,811 B2 * | 7/2009 | Nemet et al. | 235/375 |
| 2002/0016739 A1 * | 2/2002 | Ogasawara | 705/22 |
| 2002/0066781 A1 * | 6/2002 | Santa Cruz et al. | 235/375 |
| 2002/0072079 A1 * | 6/2002 | Woodaman | 435/7.32 |
| 2002/0179717 A1 * | 12/2002 | Cummings et al. | 235/462.25 |
| 2003/0118210 A1 * | 6/2003 | Patterson et al. | 382/100 |
| 2003/0179906 A1 * | 9/2003 | Baker et al. | 382/101 |
| 2004/0018641 A1 * | 1/2004 | Goldsmith et al. | 436/518 |
| 2005/0067489 A1 * | 3/2005 | Jones et al. | 235/380 |
| 2005/0122564 A1 * | 6/2005 | Zehner et al. | 359/296 |
| 2005/0139686 A1 * | 6/2005 | Helmer et al. | 235/494 |
| 2005/0199724 A1 * | 9/2005 | Lubow | 235/462.01 |
| 2006/0044341 A1 * | 3/2006 | Reichelsheimer et al. | 347/19 |
| 2006/0054695 A1 * | 3/2006 | Owada | 235/440 |
| 2006/0271011 A1 * | 11/2006 | Mock et al. | 604/500 |
| 2007/0038713 A1 * | 2/2007 | Ryu | 709/206 |
| 2007/0218206 A1 * | 9/2007 | Reichert et al. | 427/256 |
| 2008/0029606 A1 * | 2/2008 | Lewis | 235/491 |
| 2008/0111674 A1 * | 5/2008 | Quine | 340/501 |
| 2009/0164390 A1 * | 6/2009 | Calman et al. | 705/400 |
| 2009/0166401 A1 * | 7/2009 | Quine | 229/300 |
| 2010/0036778 A1 * | 2/2010 | De Vulliod | 705/500 |
| 2010/0069145 A1 * | 3/2010 | Velu et al. | 463/25 |
| 2010/0280511 A1 * | 11/2010 | Rachlin et al. | 606/34 |

OTHER PUBLICATIONS

Japan Technology Information—Rewritable printer your environmentally friendly office equipment—Jan. 12, 2009.
Checkpoint Basics—2006 Vitsab International Malmo, Sweden.
United States Postal Service—IHD Guidelines—Standard Mail—Destination Entry.

* cited by examiner

ANTHRAQUINONE DYES OF THE GENERAL CHROMOPHORE FORMULA:

500

530

520

510

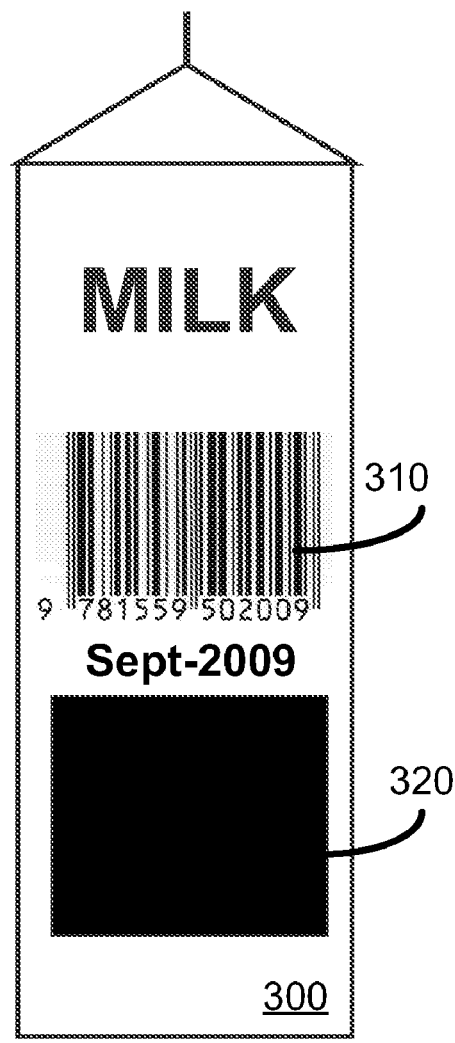
FIG. 7A
FIG. 7B

SYSTEMS AND METHODS FOR PRODUCING AND PROCESSING TIME DEPENDENT DYNAMIC BARCODES IN A MAIL DELIVERY SYSTEM

CROSS REFERENCE TO RELATED APPLICATIONS

This application is related to commonly-owned patent application Ser. No. 11/967,624, entitled "Time Limited Business Reply Mail" and filed contemporaneously herewith by Douglas B. Quine, which related application is incorporated herein by reference.

FIELD OF THE INVENTION

The illustrative embodiments described in the present application are useful in systems including those for utilizing time-dependent articles and more particularly are useful in systems including those for utilizing time-dependent dynamic barcodes in systems including a mail delivery system for manipulating delivery charges and/or sorting and delivery processing preferences.

BACKGROUND

The United States Postal Service (USPS) operates a national network of hundreds of major mail Processing and Distribution Centers (P&DCs) that process and forward mail pieces toward the destination address. The P&DCs process a tremendous volume of mail that may include hundreds of millions of letters and packages per day. The P&DCs employ automated processing equipment in the form of optical character readers, automated facer-cancellers, barcode sorters, and material handling systems. As a machineable mail piece is automatically processed in the P&DC national network, the destination barcode is used when the P&DC in possession of the mail piece decides where to send it next. The network is complex and the time required to deliver two different mail pieces may vary fairly significantly. United States Patent Application Publication No. 2005/0080660A1 entitled "System and Method for Optimizing Equipment Schedules," by deSilva, et al, published Apr. 14, 2005, generally describes USPS P&DC systems for sorting and processing mail and is incorporated herein by reference.

Since the processing requires tremendous resources, Commercial Posts and private carriers frequently provide discounts to mailers who presort mail to reduce the work required of the postal authority (Work Sharing). The discounts vary from country to country and are often dependent upon the level of presort. The more specifically the mail has been sorted in relation to delivery by the Post or carrier, the greater the discount. The United States Postal Service (USPS) has utilized one-dimensional (ID) barcodes known as the POSTNET code and the PLANETCODE. The POSTNET code provides delivery destination information such as an 11-digit ZIP code and the POSTNET code provides certain tracking related data. More recently the USPS has also used a 4-state barcode known as the ONECODE that combines certain delivery and tracking data into one barcode.

The USPS utilizes a class based pricing scheme that is not based upon delivery distance. One of the better known services is FIRST CLASS letter delivery service. FIRST CLASS Mail is said to receive expeditious handling and transportation. The stated service objectives for delivery are 1 to 3 days, but the delivery time is not guaranteed. STANDARD MAIL is available for some bulk mailings and provides for relatively lower cost delivery. Additionally, STANDARD MAIL letters may receive deferred handling. The stated service objectives for delivery are 2 to 9 days, but the delivery time is not guaranteed. Since there is no delivery guarantee, there is no mechanism to schedule or charge a premium fee for delivery on a particular day.

The USPS operates over 600 mail processing systems in the United States. Such centers may use the Delivery Barcode Sorter Input/Output Sub-System (DIOSS) and Integrated Data System (IDS) to sort mail using destination delivery codes such as the POSTNET barcode. Mail sorting equipment may utilize multiple pass sorting and may entail mail waiting for processing through the sorting equipment. There is no system in place to flag mail pieces that have been in the P&DC network for a relatively long period so that such mail pieces might be out-sorted for special processing.

United States Patent Application Publication No. 2006/0131378A1 entitled "Method for enhancing mail piece processing system," by Baker et al., published Jun. 22, 2006, describes systems for sorting and processing mail using certain printed codes such as the POSTNET and PLANETCODE barcodes and is incorporated herein by reference. However, traditional POSTNET codes are marked using traditional ink that is used to print static information.

Accordingly, there are needs for improvement including the need to provide for more effective and efficient processing of mail.

SUMMARY

The present application describes illustrative embodiments of systems and methods for utilizing time-dependent markings such as dynamic barcodes and in certain illustrative embodiments describes systems and methods for utilizing time-dependent dynamic barcodes in a mail delivery system for manipulating delivery charges and/or sorting and delivery processing preferences.

In one illustrative example, an envelope or label applied to an envelope is marked with a time-dependent marking such as a barcode, for example by marking with an ink that changes optical properties over time when it reacts with air. In an alternative, the marked section of the envelope is shielded from air until ready for use such as by using an adhesive barrier film strip that may be removed. In another alternative, a marked section is provided for dynamic marking associated with time-based delivery charges.

In another illustrative embodiment, an envelope is marked with a time-dependent marking such as a dynamic barcode printed using time-dependent ink to provide a barcode that will change after passage of time, for example such as when exposed to air. The dynamic barcode may then be used in a delivery processing system to provide information used to set processing parameters such as processing preferences and notification events. In an alternative, the dynamic barcode is marked by printing two alternate barcodes in reverse printing that change state after a period of time.

In yet another illustrative example, an item, such as package containing perishable goods, is marked with a time-dependent marking such as a barcode that is used to determine a time-out condition such as expiration.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

FIGS. 7A-7B are schematic diagrams of a representative item having a time-dependent marking according to an illustrative embodiment of the present application.

DETAILED DESCRIPTION

Figure 1A:
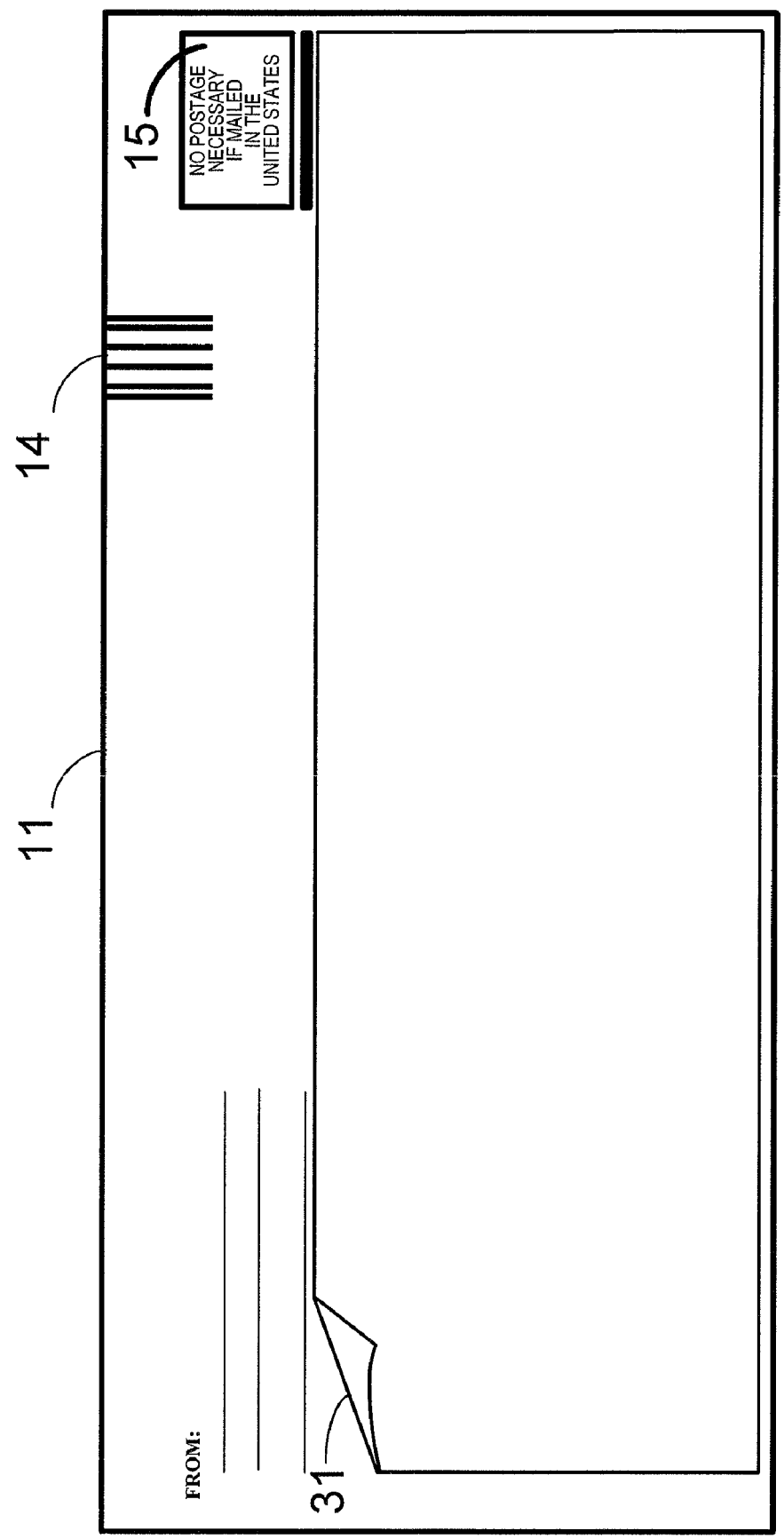
FIGS. 1A-1C are schematic diagrams of a representative envelope according to an illustrative embodiment of the present application.

The illustrative embodiments of the present application describe systems and methods including those that are useful for utilizing time-dependent markings such as dynamic barcodes. In certain illustrative embodiments, the application describes systems and methods for utilizing time-dependent dynamic barcodes in a mail delivery system for manipulating delivery charges and/or sorting and delivery processing preferences. In at least certain embodiments, the described systems provide an advantage in not requiring USPS systems to be modified since the system will merely respond to the changed barcode using its customary processing. In certain embodiments, even if the information processing systems associated with the barcode data read during processing are modified to perform the processes described herein, the traditional barcode reader systems may be used. Similarly, with regard to article marked with dynamic barcodes, traditional barcode readers may be employed.

As shown herein, several time-dependent marking systems may be utilized with the illustrative embodiments. However, an inkjet ink containing a reactive dye such as Reactive Blue 19 is described in detail. Several described marking systems provide for time-dependent inks that change from dark to clear. Other marking systems are described that change from clear to dark. When a barcode is described herein using dark to clear ink that needs to change from unreadable to readable state over time, it may be printed in reverse as a dark block including static portions that remain and dynamic portions that change to clear state to reveal the new barcode in readable format. Alternatively, the embodiments described herein may employ a label adhered to an envelope or article or a substrate that changes optical properties over time.

In the traditional mail delivery system, the POSTNET barcodes are used to provide destination information in a routing system. Wherever the mail piece may be located inside of the USPS routing system, the barcode can be read and the envelope may be sent along a route, presumably toward the destination. The barcodes utilized are typically printed using an ink that provides static information. Such barcodes do not provide any information regarding the status of the mail piece such as whether it is on schedule, early or late. With regard to items such as perishable products, the barcodes used on the packaging of such items for identification purposes do not provide time information useful for determining if a product is expired.

In the USPS mailing system, there is no automated means for charging a premium delivery fee for delivery on a particular day such as date certain delivery. If the delivery goal for a first class mail piece is not met, the recipient may go to the post office to file a complaint, but the delivery dates are not guaranteed. However, the more expensive EXPRESS MAIL service delivery dates may be guaranteed, but a personal visit to the post office is required for a refund if the guarantee is not met.

In the current USPS delivery system, individual mail pieces are not necessarily assigned a unique identification number. Each mail piece may be processed by multiple mail processing centers along a route toward its ultimate destination. A POSTNET barcode merely provides the USPS sorters and routers a way to send the mail piece along a reasonable path to its final destination. Accordingly, there may not be a centralized database including information regarding the particular mail piece and its delivery processing history. Additionally, the USPS allows certain standard class mailers to request delivery in a certain time window, but there is no effective methodology or system for complying with, tracking or billing for such requests.

As described herein, a time-dependent marking can provide dynamic information through the use of time-dependent inks, substrates or other marking methods. For example, a barcode may be designed to change over time and thus provide different information to the USPS barcode scanners depending upon when the barcode is scanned. It might be possible to provide mail piece specific information using relatively complex devices such as RFID devices attached to each mail piece, but such a solution might be prohibitively expensive and not compatible with current mail processing equipment. In certain illustrative embodiments described herein, a time-dependent marking such as a time-dependent ink barcode may provide dynamic information to the legacy USPS mail processing equipment with requiring equipment hardware or software changes. Such systems would not necessarily require a centralized database for uniquely identifying each mail piece. Here, the object cleverly reports different information about itself to the USPS equipment through a time changing barcode.

As described herein, time-dependent markings including barcodes can be used to provide date certain delivery. For example, a mailer might want to slow down the delivery process to achieve receipt on a particular day for marketing or other purposes. Accordingly, a mail piece may be held or looping in a mail processing system waiting for a time-dependent barcode change to trigger progression to the next phase of delivery to enable date certain delivery. Such a date certain delivery service might also attract a premium service fee.

Certain embodiments herein describe barcode that change over time. The systems and methods employed herein provide for barcodes that correctly change from one number to another and yet also account for changes in any barcode redundancy and error checking codes such as checksums in order to enable a changed barcode that may be read by the USPS systems. In certain embodiments, human readable markings are also employed to provide an indication of a state change.

Figure 1B:
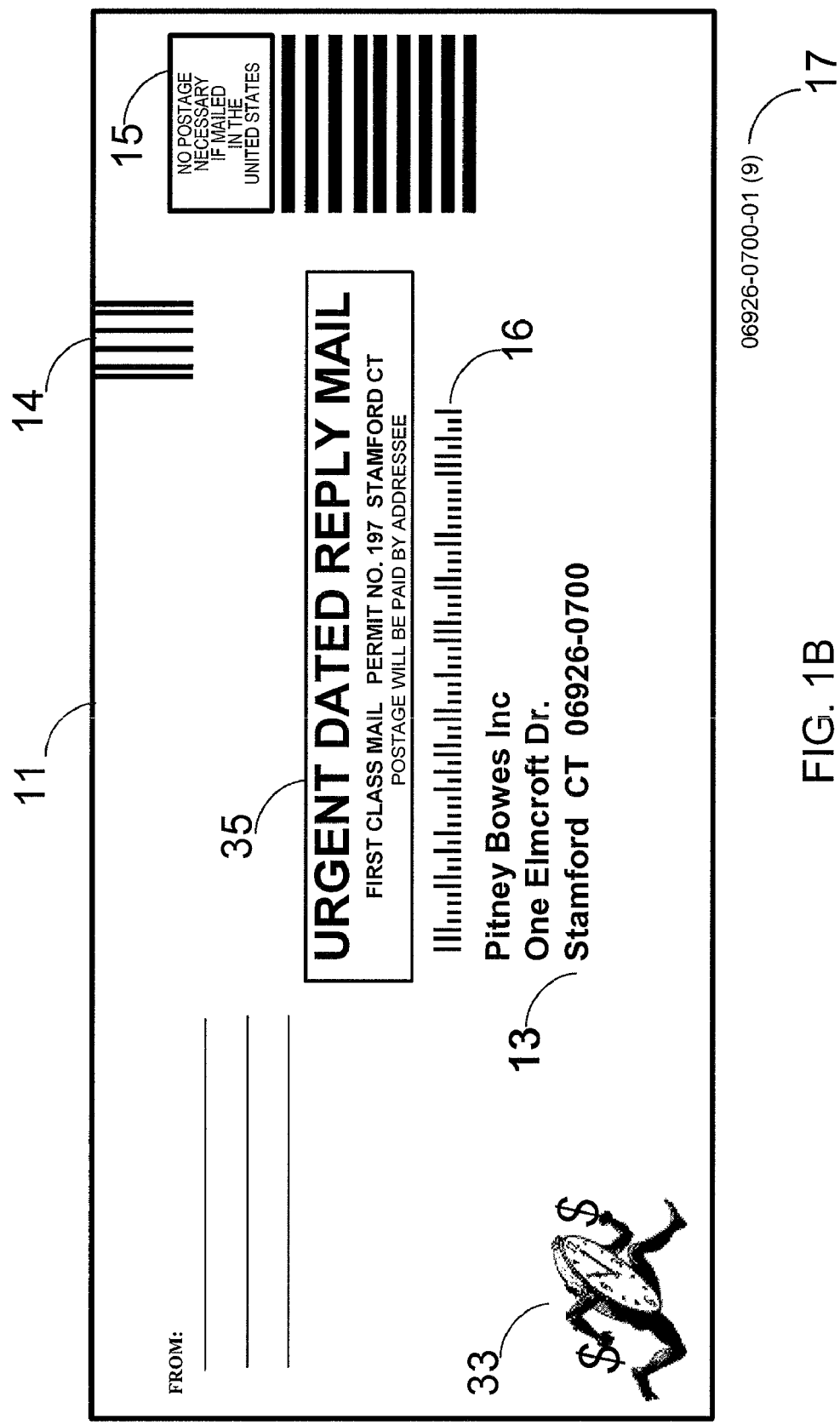
Figure 1C:
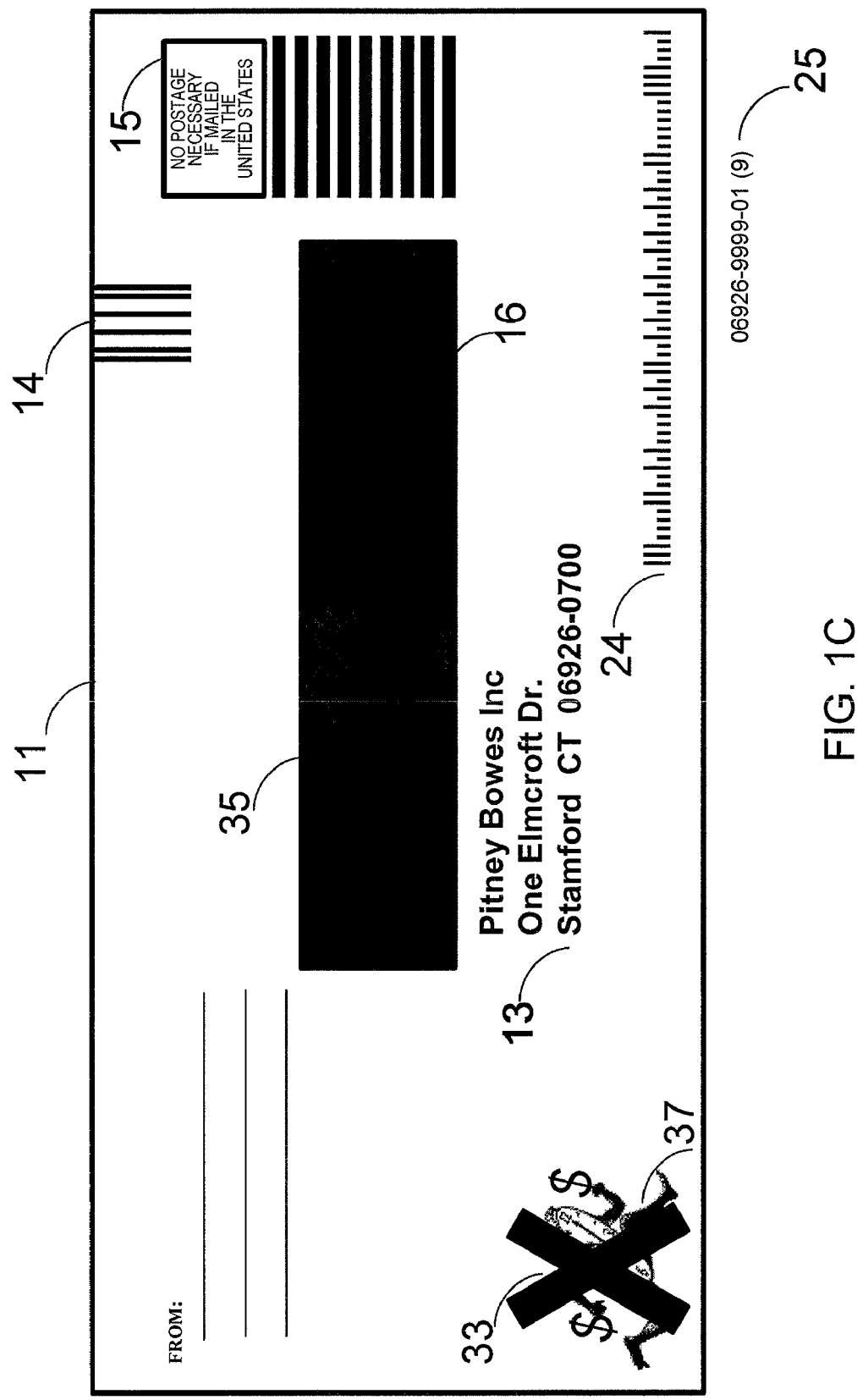

Referring to FIGS. 1A-1C, schematic diagrams of a representative envelope at different periods of time are shown according to an illustrative embodiment of the present application. In FIG. 1A, envelope (mail piece) 11 is a business reply mail piece. It includes a standard FIM mark 14 and a postage block 15. A protective barrier film 31 covers a time-dependent ink marking as shown below. The protective barrier film 31 provides a hermetic seal so that the reactive oxidizing ink does not begin to age until the film is removed. In an alternative, envelope 11 may instead include an EINK display as described below to provide time-dependent markings.

In FIG. 1B, the envelope 11 is shown shortly after the protective barrier film 31 is removed. The POSTNET BARCODE 16 is printed in normal ink using one print head, but the surrounding reactive ink printed with a second print head blocks the barcode after the state change. Barcode 16 decodes to the 11 digit destination ZIP shown at 17 that corresponds to address 13. Urgent notices are provided at 33 and 35.

In FIG. 1C, the envelope 11 is shown after the reactive ink has changed visible states. The POSTNET BARCODE 16 and urgent notice 35 are blocked out by the ink that changed state and no longer will be read in a scanner. Similarly, urgent notice 33 is obscured by the time-dependent ink. New POSTNET BARCODE 24 is printed using reactive ink and has now appeared in the time-dependent marking to provide a different destination ZIP code as shown at 25. Thus, the new code may be used to out-sort the mail piece for special processing.

Figure 2:
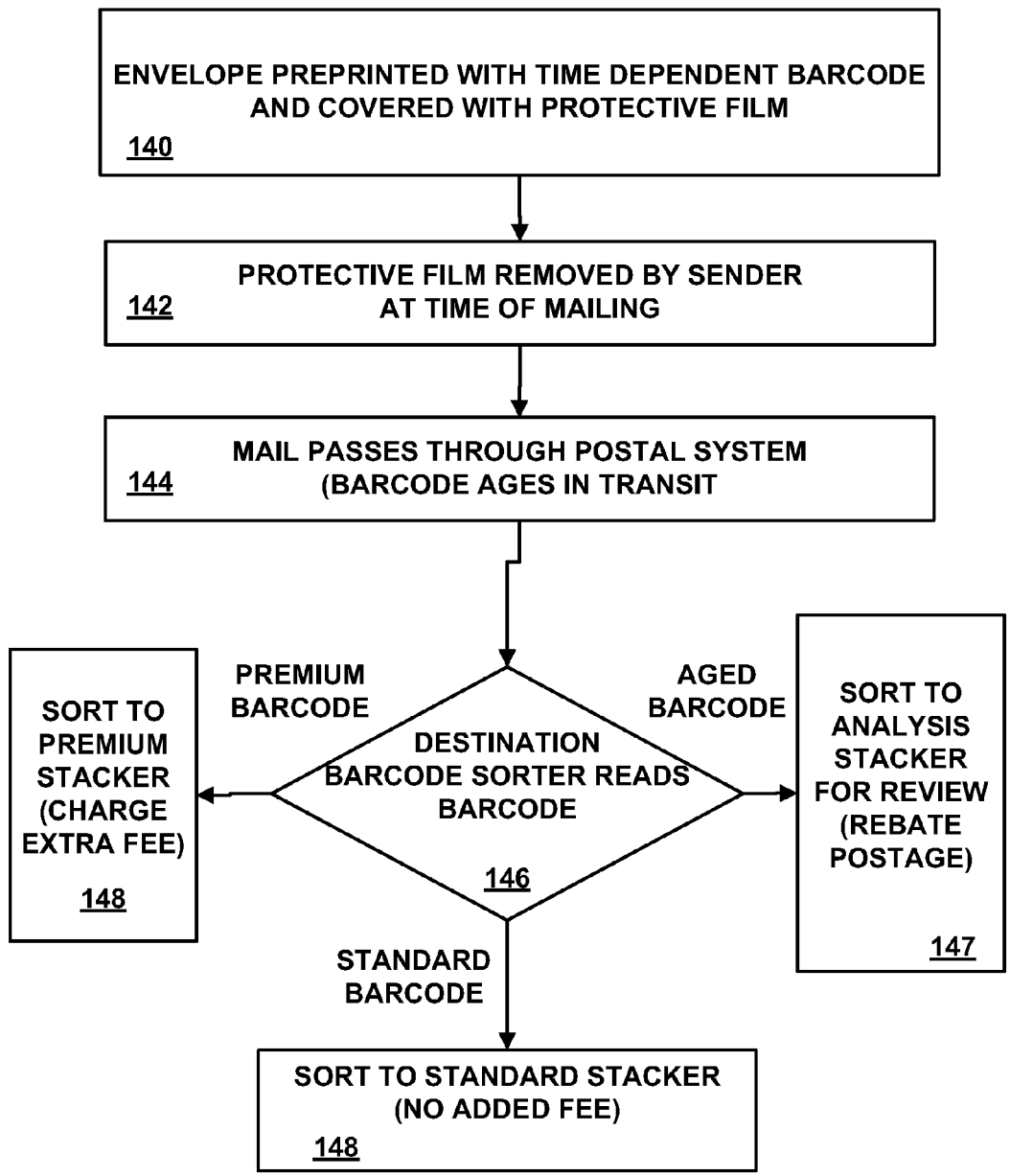
FIG. 2 is a flowchart of a representative method for processing the envelope of FIGS. 1A-1C according to an illustrative embodiment of the present application.

Referring to FIG. 2, a flowchart of a representative method for processing the envelope of FIGS. 1A-1C according to an illustrative embodiment of the present application is shown. In step 140, an envelope (mail piece) 11 is pre-printed with a time-dependent barcode and covered with a protective barrier film 31 to hermetically seal the oxidizing ink. In step 142, the protective film 31 is removed by the sender at the time of mailing. In step 144, the mail piece 11 moves through the postal processing network as the time-dependent barcode ages in transit.

In step 146, the destination barcode sorter reads the barcode. If it is a premium (early) barcode, in step 148, the sorter sorts the mail piece to a premium stacker and charges a premium fee. If the barcode is a standard barcode, in step 149, the sorter sorts the mail piece to a standard stacker and there is no additional fee. If the barcode is an aged (late) barcode, in step 147 the sorter sorts the mail piece to the analysis stacker for review and a postage rebate operation.

In another alternative, the POSTNET CODE 16 decoded at reference 17 may change to the POSTNET BARCODE 24 decoded at reference 25 that shows a change in the 11 digit destination ZIP such as to automatically "out-sort" the mail piece to a special 11 digit ZIP code at the postal facility—here the ZIP+4 xxxxx-9999 25 to indicate special processing.

Figure 3:
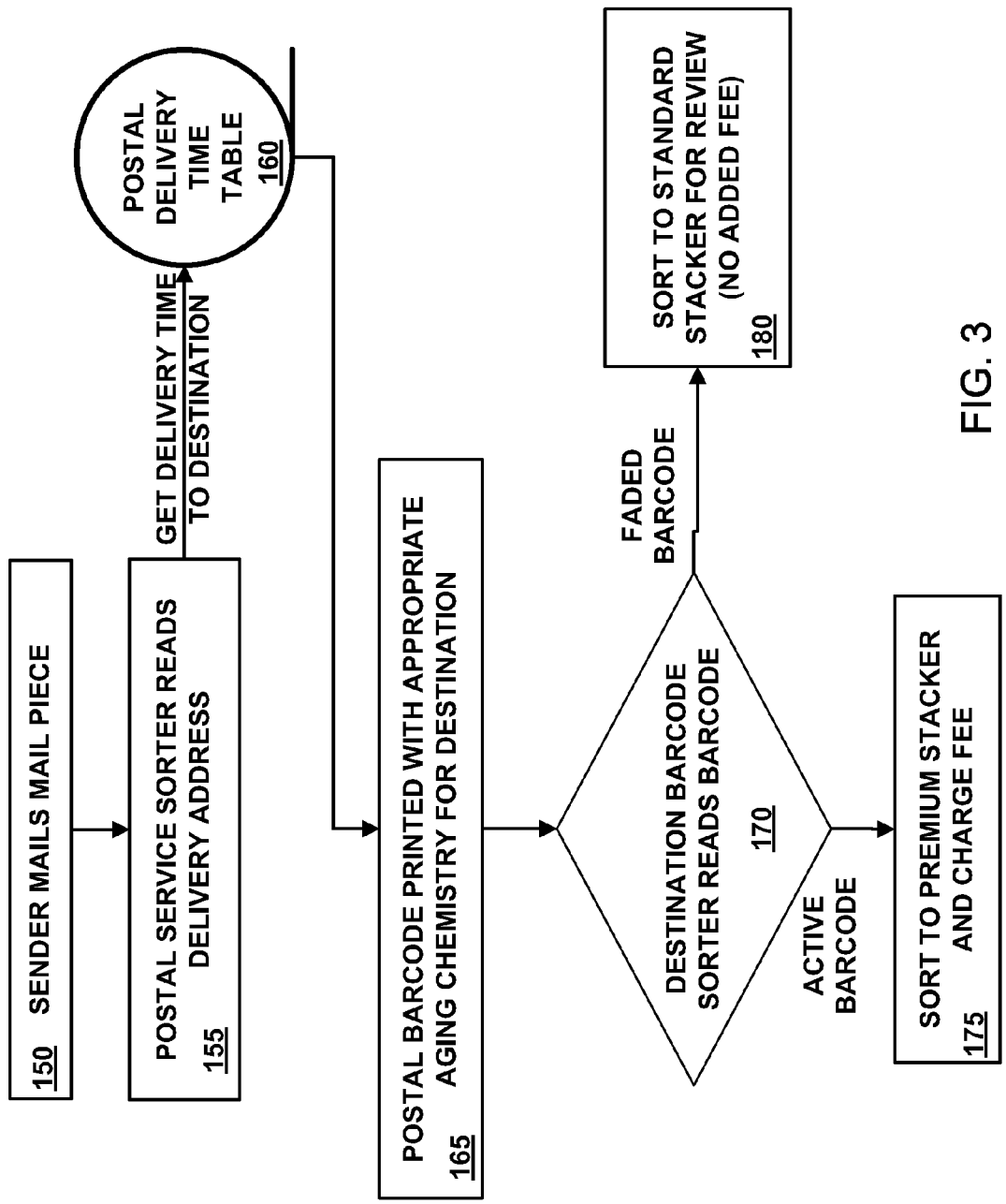
FIG. 3 is a flowchart of a representative method for processing an envelope including a time-dependent marked section according to an illustrative embodiment of the present application.

Referring to FIG. 3, a flowchart of a representative method for processing an envelope including a time-dependent marked section according to an illustrative embodiment of the present application is shown. In step 150, a sender sends a mail piece that does not yet contain the relevant time-dependent marking. In step 155, the postal service sorter reads the destination address or a POSTNET BARCODE. In step 160, the postal service system computes the estimated delivery time for that destination. In step 165, a time-dependent postal barcode is printed with appropriate aging chemistry for the particular destination. For example, if the mail piece is only traveling across town, a one-day fade chemistry would be used. If the mail piece was to travel across country, a three-day fade chemistry would be used. Alternatively, the class of service being utilized may also be factored into the aging chemistry selection. A priority mail envelope might receive a two-day fade chemistry barcode as compared to a first class envelope being marked with a three-day fade chemistry barcode.

In step 170, the USPS destination barcode sorter reads the time-dependent postal barcode. If the time-dependent postal barcode is faded, the mail piece is sorted in step 180 to a standard stacker for review (no added fee is applied). If an active barcode is scanned, the mail piece is sorted in step 175 to a premium stacker and an expedited fee may be charged.

Figure 4A:
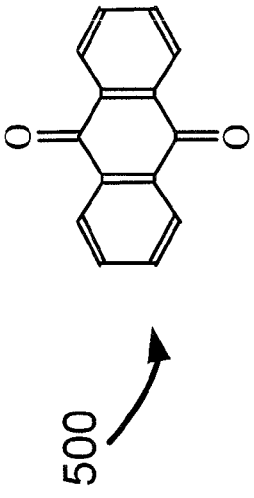
FIG. 4A is a graphical representation of a general chromophore formula of an Anthraquinone dye according to an illustrative embodiment of the present application.

Referring to FIG. 4A, a graphical representation of a general chromophore formula 500 of an Anthraquinone dye according to an illustrative embodiment of the present application is shown. In this marking alternative for the embodiments described herein, a reactive ink changes visible state from dark to clear over time. This ink may be used to create a time-dependent barcode by positively printing the first barcode using the reactive ink and then printing a "reverse print" dark block for a second barcode nearby. The oxidized reactive ink is printed on the portions of the block that must disappear to reveal the second (replacement) barcode.

The printing process involved includes a two step print process in which the constant marking portions are printed first and then any portions that must disappear over time are overprinted with an oxidizing solution to make those portions time dependent. The chemical reaction involved is:

Reactive Dye formulated inks+oxidizing agent-->new product(colorless)  (EQ. 1)

Because this reaction is pH, metal type and oxidizing concentration dependent, these variables are used to control the marking ink fading time. Reactive dyes suitable for the inks described include Anthraquinone dyes of the general chromophore formula 500. Two specific examples are Reactive Blue 4 and Reactive Blue 19. Some examples of the oxidizing agents suitable for the time-dependent ink include (1) copper, manganese and other transition metal oxidizing salt solutions and (2) hydrogen peroxide solutions. An illustrative example of a reactive ink formulation is shown in Example 1:

| Component | Wt. % | Comment |
|---|---|---|
| Reactive Blue 19 | 5% | Reactive dye |
| Ethylene Glycol | 15% | Humectants |
| Butyl Carbytol | 5% | Penetrants |
| Buffer Solution | 10% | |
| Biocide | 1% | |
| Water | 64% | |

In an alternative, the permanent portions of the time-dependent marking such as a barcode are printed using a multi-ink print head using a first color of normal black ink and then using a second color having reactive ink to print the variable portions of the time-dependent marking. In yet another alternative, the reactive ink may be pre-mixed and used in an air-tight ink supply for a printer such as a collapsible bladder ink supply.

Figure 4B:
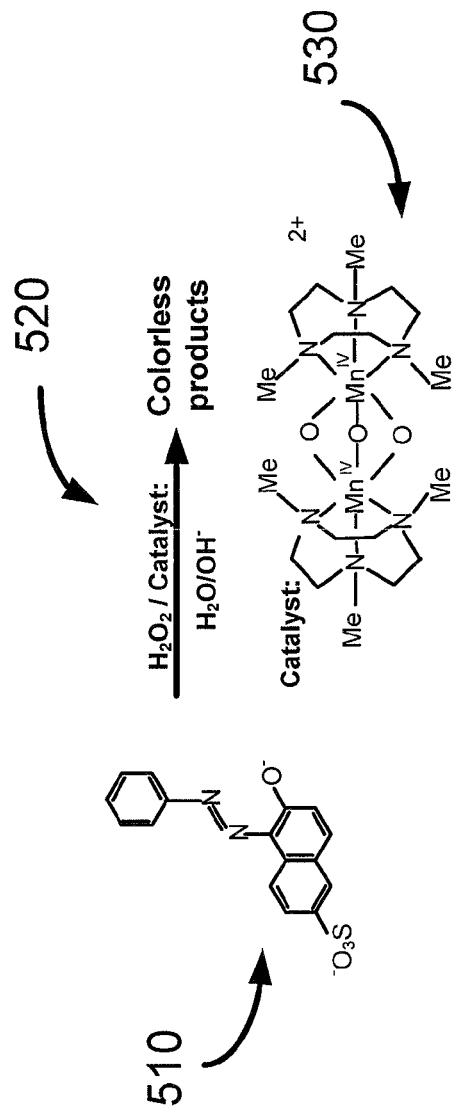
FIG. 4B is a graphical representation of a reaction of a marking compound according to an illustrative embodiment of the present application.

Referring to FIG. 4B, a graphical representation of a reaction of a Azo group marking compound 510, catalyst 530 and reaction 520 according to an illustrative embodiment of the present application. As an alternative, an Azo containing group will react as shown in FIG. 4B to produce a colorless product.

Figure 5A:
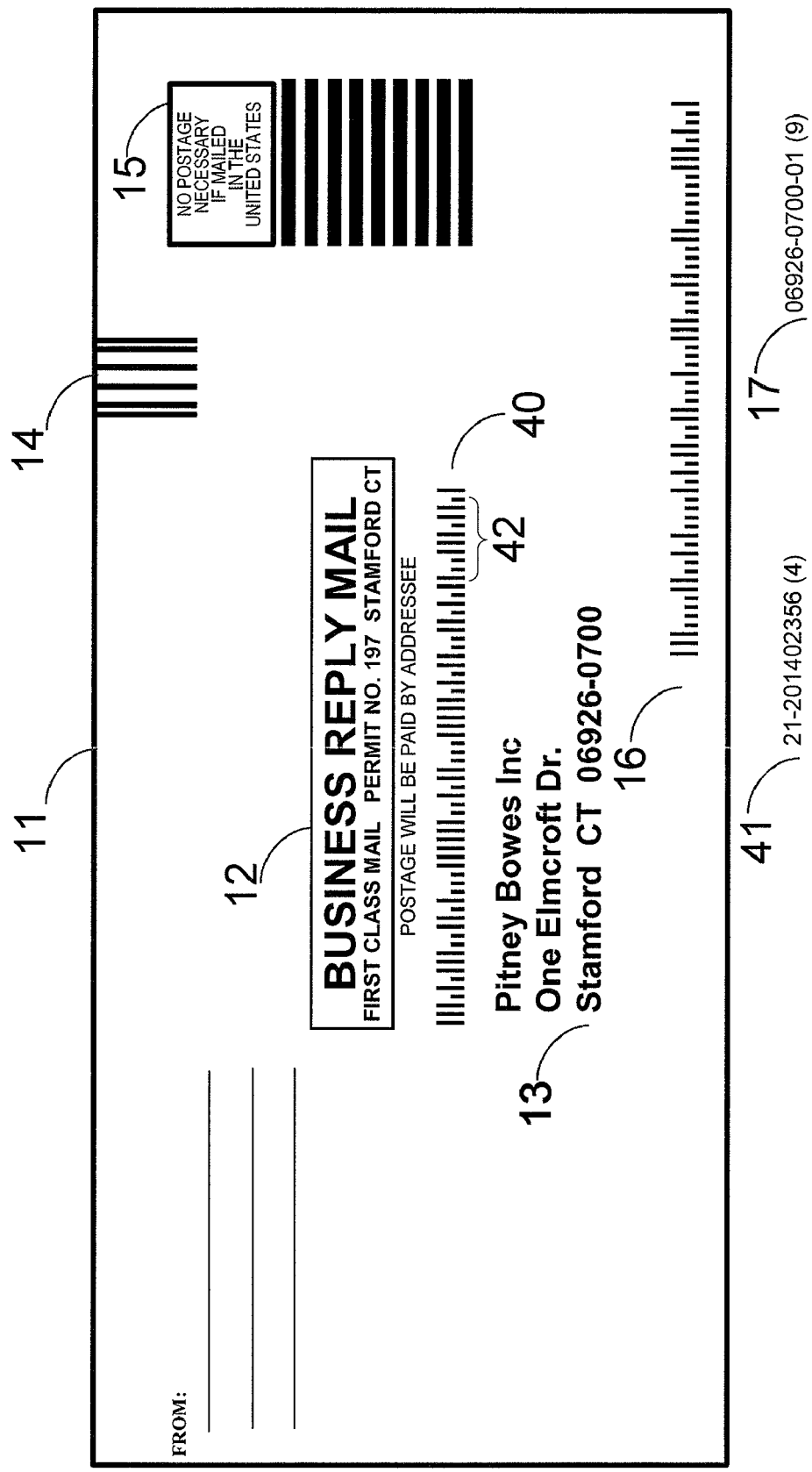
FIGS. 5A-5B are schematic diagrams of a representative envelope having a time-dependent code according to an illustrative embodiment of the present application.
Figure 5B:
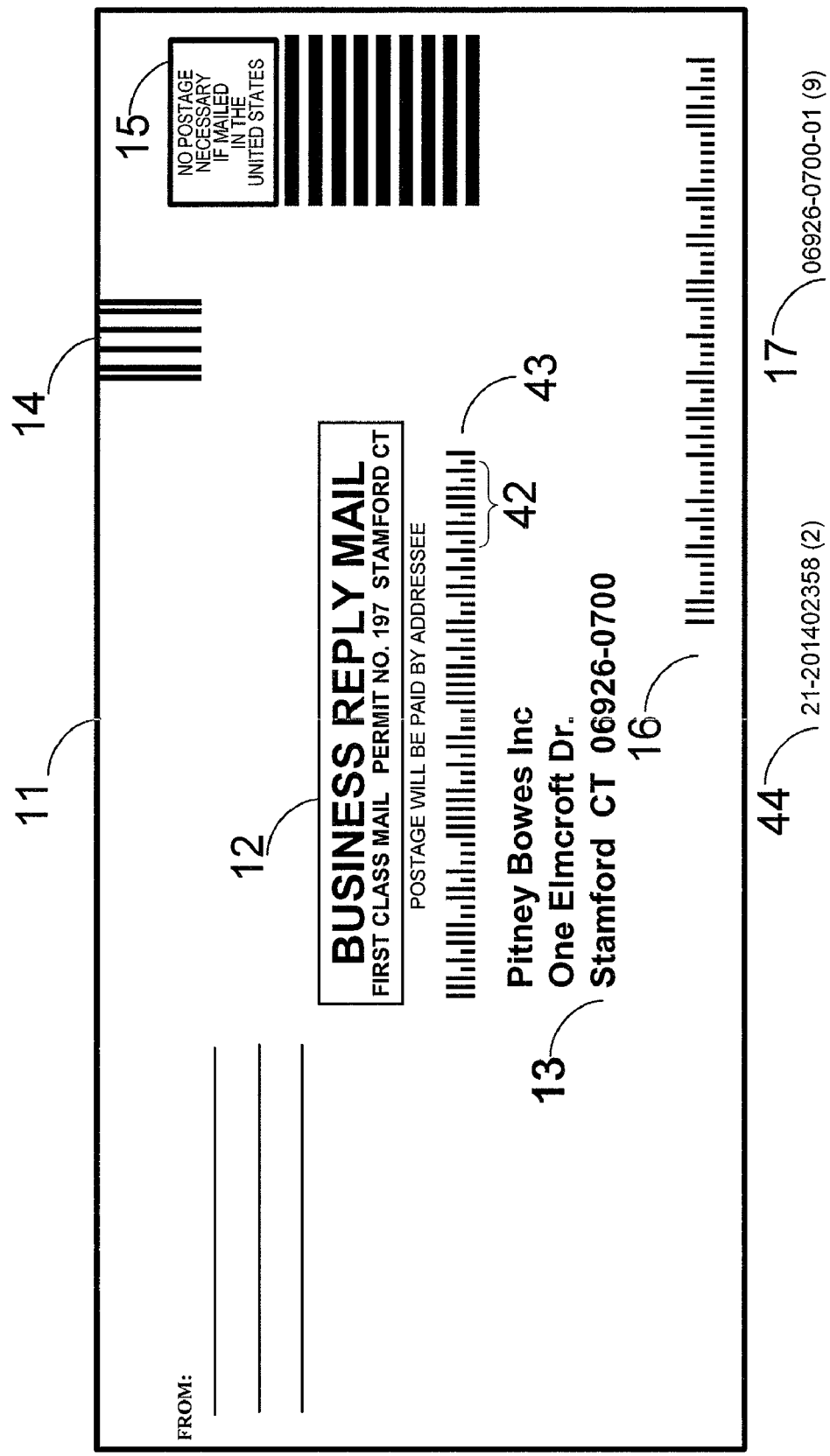

Referring to FIGS. 5A-5B, schematic diagrams of a representative envelope having a time-dependent code according to an illustrative embodiment of the present application are shown. In FIG. 5A, mail piece 11 is shown at a first time frame. The mail piece 11 is a business reply envelope and includes standard FIM markings 14, a postage block 15 and permit field 12.

The destination address 13 is printed and corresponds to static delivery destination POSTNET CODE 16. POSTNET CODE 16 decodes as shown in 11 digit delivery point ZIP code 17. The time-dependent PLANET CODE 40 initially decodes as 21-201402356(4) and represents an "origin CONFIRM—Residual Mail (21)" with a customer ID of 201402356 and a checksum of 4 shown in reference numeral 41. The portions of the barcode 42 are treated to produce a time-dependent code as described herein.

In FIG. 5B, the mail piece 11 is shown at a second time frame. The time-dependent PLANET CODE 43 has changed and now decodes as 21-201402358(2) and represents an "origin CONFIRM—Residual Mail (21)" with a customer ID of 201402358 and a checksum of 2 shown in reference numeral 44. The Checksum has been accurately updated and the second state of the barcode may be read. The new barcode may be used as described below for modifying payment terms, providing notification events and/or setting processing parameters.

In another alternative, the POSTNET CODE 16 may also be printed in time-dependent ink in order to change the destination ZIP such as to automatically "out-sort" the mail piece to a special 11 digit ZIP code postal facility for further processing after the first time period has elapsed.

Figure 5C:
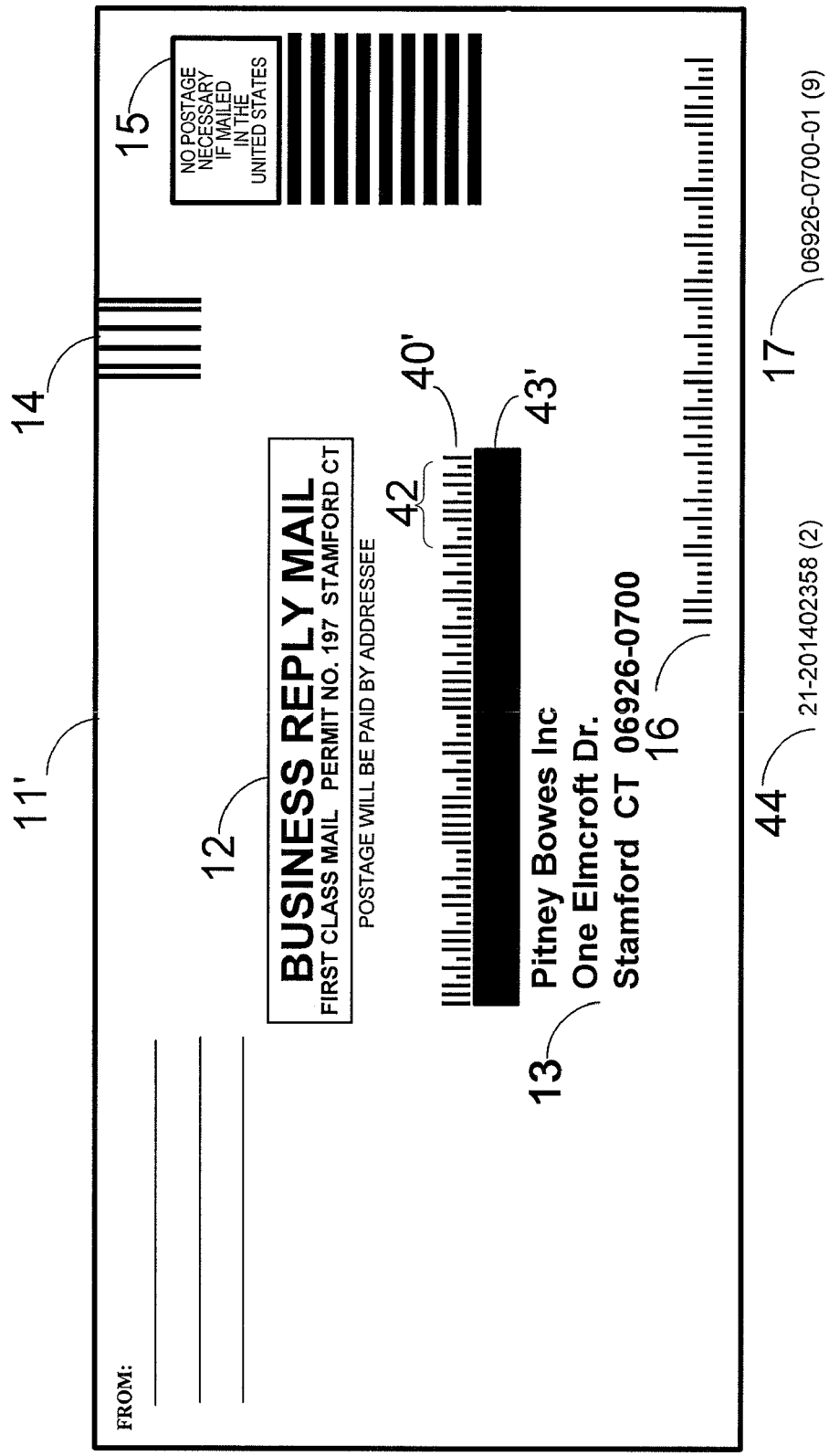
FIG. 5C is a schematic diagram of a representative envelope having an alternate time-dependent code according to an illustrative embodiment of the present application.

Referring to FIG. 5C, a schematic diagram of a representative envelope 11' having an alternate time-dependent code according to an illustrative embodiment of the present application is shown. In this illustrative embodiment, visible state change is accomplished using a replacement barcode printed in standard ink that is surrounded by a dark to light reactive ink and oxidizing agent. Original barcode 40' is visible during the first time frame and since the entire code is treated with the oxidizing agent, the barcode 40' will become colorless during the second time frame. Barcode 43' is a dark block during the first time frame and while visible as a block, will not be read by a barcode scanner. Barcode 43' is printed in normal ink and a "reverse print" is applied to surround the barcode in the box using a time-dependent reactive ink in order to allow the necessary portions of the "reverse print" to disappear to reveal barcode 43' in the second time frame.

Figure 6:
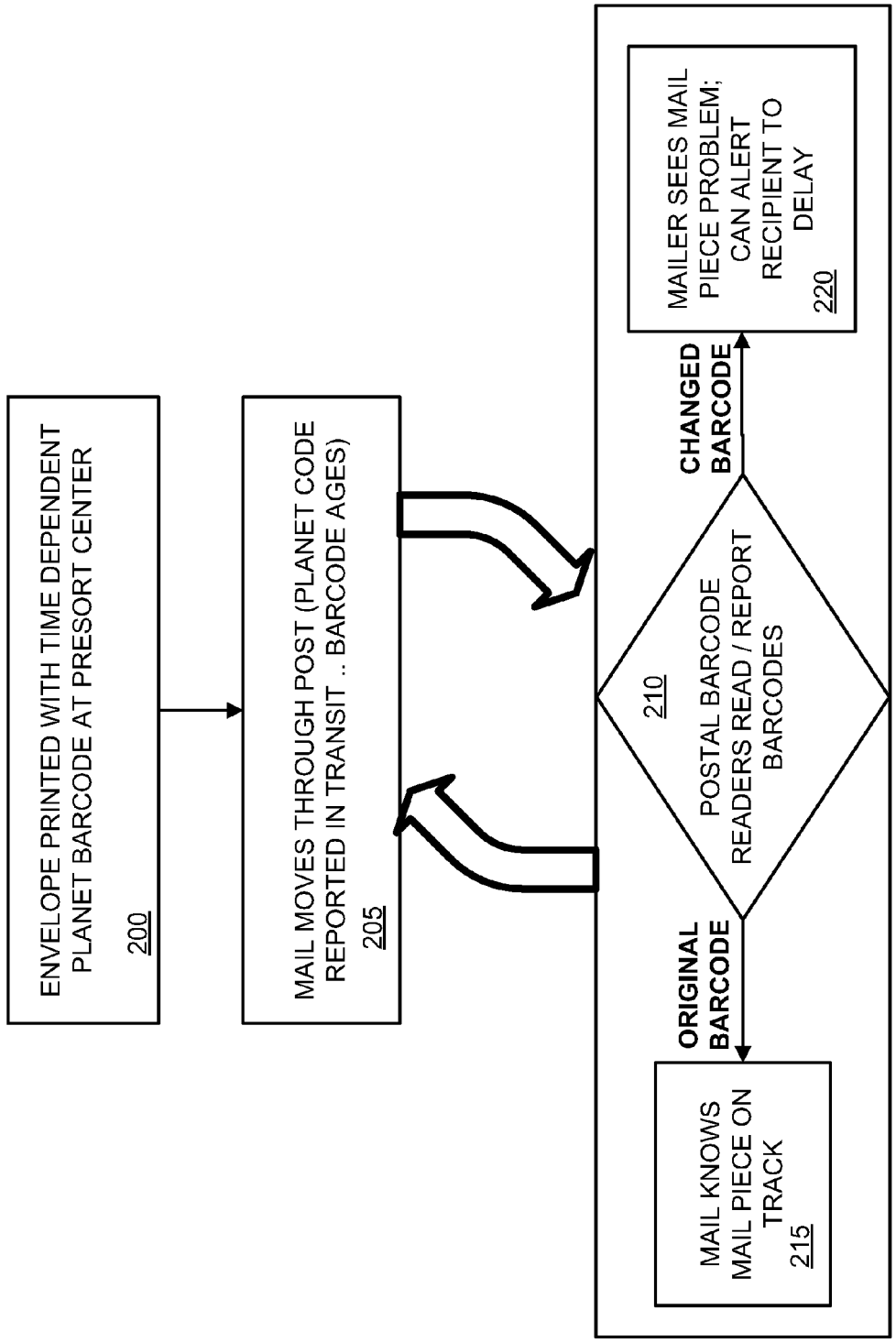
FIG. 6 is a flowchart of a representative method for processing an envelope including a time-dependent code according to an illustrative embodiment of the present application.

Referring to FIG. 6, a flowchart of a representative method for processing an envelope (mail piece) including a two-state time-dependent code according to an illustrative embodiment of the present application is shown. In step 200, an envelope is marked with a time dependent PLANET barcode at a presort center such as the PITNEY BOWES PSI presort services of Omaha, Nebr. The envelope may be printed or a time-dependent barcode applies using a label.

In step 205, the mail piece is inducted and processed by the USPS delivery system. The PLANET barcode reads are reported as the mail piece is read in transit and the barcode also ages. In step 210, the postal system barcode readers read and report the barcode on the mail piece. If the barcode has changed, the process proceeds to step 220 and the postal system is presented an opportunity to take corrective action. For example, in step 220, the corrective action includes alerting the intended recipient and/or sender notification of the delay. If the original barcode is read, the USPS in step 215 can infer that the mail piece is being processed timely.

Alternatively, a three-state time-dependent barcode may be used. A billing barcode (e.g., PLANET CODE, 4-state track and trace code, accounting code or other code) is applied to a mail piece with two or more defined time states. For example, a mail piece submitted to the USPS including a PLANET CODE barcode that decodes as: 21-201402356-4 represents an "origin CONFIRM—Residual Mail (21)" with a customer ID of 201402356 and a checksum of 4. Accordingly, that PLANET CODE could be defined to mean early delivery and printed with the marking assigned to a first time period (designated early delivery). The second barcode visible during the second time frame decodes as 21-201402357-3 and is assigned to on-time delivery. The third barcode visible during the third time frame decodes as 21-201402358-2 and is assigned to late delivery. Billing may be controlled by a destination scan of the barcode. Thus, if the first barcode is visible when delivered, a premium delivery fee may be applied. Similarly, if the second barcode is visible, standard billing may be applied. Furthermore, if the third barcode is visible, a refund may be applied.

Additionally, the time-dependent barcodes may be used to set notification events. If the third barcode is visible during processing, a notification may be sent to the sender and/or recipient to provide notification of delayed delivery. Similarly, if the second barcode or third barcode are visible during processing, the mail piece may be out-sorted for expedited processing so that the mail piece arrives in a more timely fashion.

For example, such systems may be useful in stand-alone automated billing of delivery charges for date certain delivery such as would be useful in election-related mailings and time-sensitive sale advertisements for stores. Such a system allows for stand-alone differential billing for early delivery (perhaps somewhat less valuable than date certain delivery) and potentially different billing for late delivery (e.g., election campaign materials or expired sales coupons have no value after the election or sale, respectively). Stand-alone billing for delivery options is used to mean that no linkage is required to the original mail manifest to determine the mailing date.

Referring to FIG. 7A and FIG. 7B, schematic diagrams of a representative item such as a milk container 300 having a time-dependent marking according to an illustrative embodiment of the present application is shown to illustrate systems and methods for using time-dependent barcodes with time sensitive products such as perishable goods. With reference to FIG. 7A, a milk container 300 is shown at a first point in time, preferably with the markings applied at a known amount of time from when the milk is or is going to be placed in the container. Alternatively, the marking is performed at an appropriate time considering the pasteurization time of the milk to be packaged. For example, if the particular marking formulation requires 10 days to age and the milk shelf life is 5 days from packing, then the marking should be applied 5 days before the container is to be used. For example, a first marking, such as barcode 310 includes the expiration date and is marked by printing using a time-dependent ink that goes from a visible color as shown in FIG. 7A to an invisible state as shown in FIG. 7B. Marking 310 is intended to provide information during the first time period, which in the illustrative embodiment is the time during which the milk may be sold. Marking 320 includes a bottom layer including a barcode and a blocking top layer. The top layer of 320 is also marked, preferably by printing the overlay using the same time-dependent ink as used for barcode 310. Alternatively, marking 320 may be printed using a permanent non-reactive ink. Marking 320 is intended to provide information during a second time period, which in the illustrative embodiment is the time period after which the milk may not be sold.

Referring to FIG. 7B, the milk container 300 is shown at the second point of time, preferably at a time to provide a reasonable safety margin for providing a notice that the packaged milk is out of date. The marking 310 has changed to an invisible state and the original barcode is no longer visible and can no longer be scanned. In this illustrative embodiment, marking 320 includes a second time period message that includes a barcode that differs from that in marking 310 and also includes an out-of-date message. When the top layer of 320 changes to its invisible state, the barcode and message on the lower layer become visible and also can be scanned. Accordingly, a stock person using a barcode scanner will scan a different barcode during the second period of time. Therefore, the scanner device can be utilized to provide a message to the stock person to remove the out-of-date item. In an alternative, the refrigerated display case may include a scanner to scan the barcodes periodically.

In this illustrative embodiment, two time-dependent barcodes are utilized. The original barcode that is rendered unreadable after passage of time and the new barcode that becomes visible and readable after passage of time. Preferably, the same ink is used to accomplish obscuring the original barcode and making visible the second barcode so that the changes happen at or near the same time. In an alternative, three-state barcodes may be used to enable discounting a near end-of-life product such that the UPC code will ring up at the register as a discounted item after the passage of time without further work on behalf of the store staff.

Figure 8:
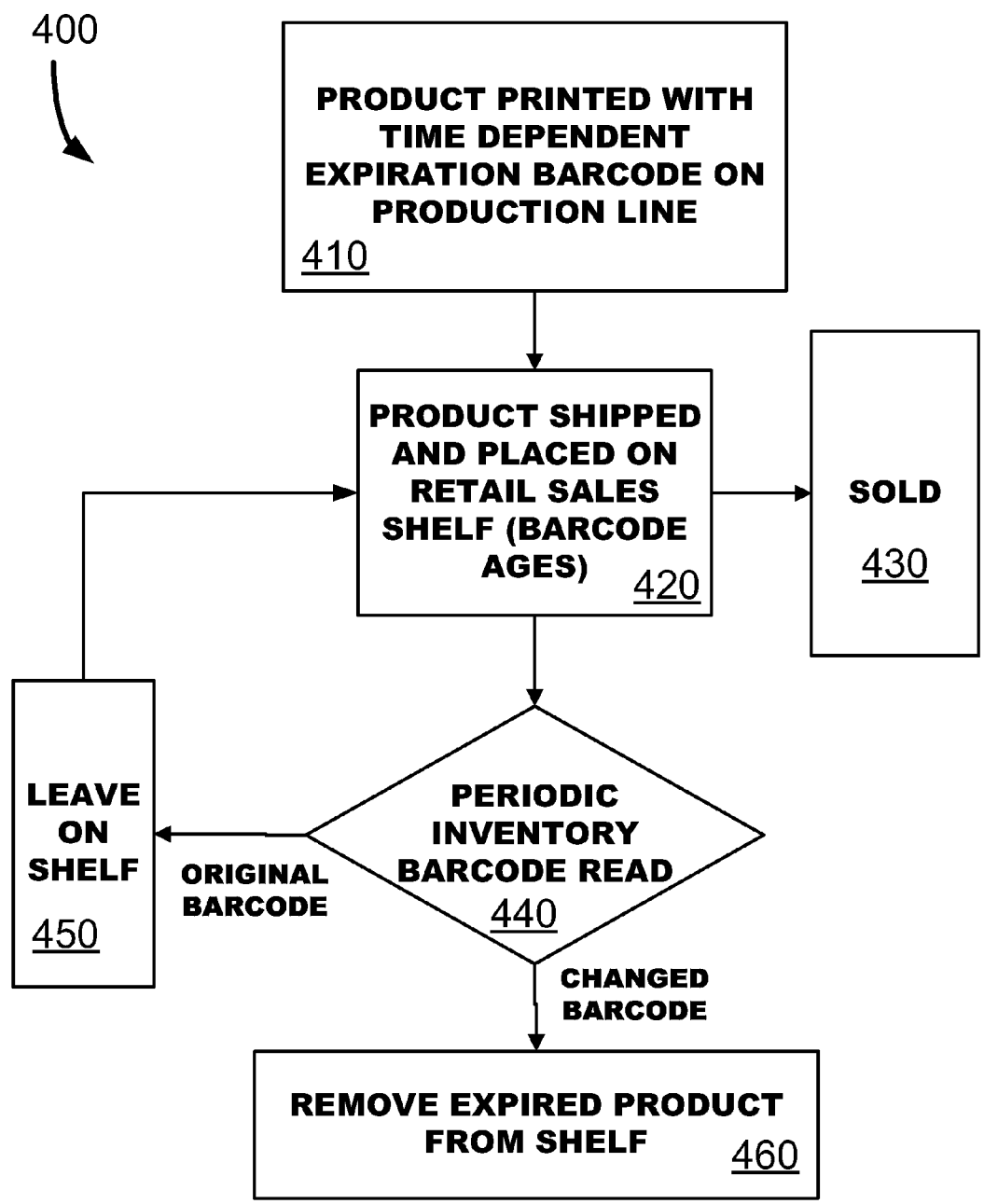
FIG. 8 is a flowchart of a representative method for processing an item including a time-dependent marking according to an illustrative embodiment of the present application.

Referring to FIG. 8, a flowchart of a representative method 400 for processing an item including a time-dependent marking according to an illustrative embodiment of the present application is shown. In step 410, an item such as a product package is marked with at least one time-dependent barcode on a production line. The markings are preferably applied at a known appropriate amount of time before or after the time when the milk is placed in or scheduled to be placed in the container. In step 40, the article is used. In this example, the article is a perishable grocery item and is placed on a supermarket shelf and the barcode continues to age. If the milk is sold, in step 430 the item processing process stops with the sale.

However, if the milk container remains on the shelf, a stock person (or refrigerator scanner) periodically scans the stock by scanning the barcodes in step 440. If the scan in step 440 reveals the original barcode, the stock person leaves the item on the shelf in step 450 and the process returns to step 420. If the barcode has changed, the process instead proceeds to step 460 and the stock person is instructed to remove the expired item from the shelf.

As an alternative substitution for the ink described with reference to time-dependent barcodes for time sensitive products, known time-temperature indicator (TTI) systems may be used to facilitate the optical conversion shown in the progression from FIG. 7A to FIG. 7B including those described in U.S. Pat. Nos. 6,244,208 B1, 6,517,239 B1 and 6,524,000 B1. Similarly, time-temperature indicator ink available from Digital Ink Technologies PTY Ltd. of Australia may be utilized. Furthermore, Commonly-owned U.S. Pat. No. 6,795,376 B2 entitled Method for Displaying an Environmentally Modulated Expiration Date, issued Sep. 21, 2004 to Douglas B. Quine and is incorporated herein by reference. Additionally, as an alternative embodiment for processing articles, the systems referred to or described therein may be advantageously utilized with alternatives of embodiments described herein such as to display a time-dependent barcode.

Certain known time changing marking systems may also be alternatively advantageously utilized with the illustrative embodiments described herein. For example, certain visitor badge systems employed utilize time-dependent markings. For example, a VOID message may appear over time to indicate that a guest badge is no longer valid. Furthermore, a colored background may change color over time to indicate that a guest badge is no longer valid. In addition to the reactive inks described, additional reactive inks may be used as well as certain inks that exhibit color changes over time such as with exposure to Ultraviolet (UV) radiation. Accordingly, many time-dependent color changing marking systems have been described with reference to time-dependent visitor labels. U.S. Pat. No. 6,452,873 B1 entitled Visually Changing Paper Time Indicator Employing Controllable Barrier, issued on Sep. 17, 2002 to Robert Holt, et al. and is incorporated herein by reference. U.S. Pat. No. 6,752,430 B2 entitled Time Dependent Color-Changing Security Indicator, issued on Jun. 22, 2004 to Robert Holt, et al. and is incorporated herein by reference. U.S. Pat. No. 6,916,130 B1 entitled Method of Printing, Activating and Issuing an Activated Time Dependent Label, issued on Jul. 12, 2005 to Robert Holt, et al. and is incorporated herein by reference. Any of the appropriate time-dependent marking systems and compositions referenced and/or described therein may be advantageously utilized as alternative substitute compositions for the marking components of any the illustrative embodiments described herein.

In another alternative applicable as a substitute marking system to any of the illustrative embodiments herein, the "dark to light" conversions and "light to dark" conversions applicable to the described embodiments are achieved instead using EINK low-power displays and a processor as a substitute to implement the various data transmission and manipulation required including the time delay based conversions described herein. EINK displays and associated processors are available from E Ink Corporation of Cambridge, Mass.

EINK displays permit any pixel to display black or white (and later to change any pixels as desired). As can be appreciated with reference to the embodiments described above, a mail piece such as a return envelope with an EINK display front could be programmed at the time of mailing from business to customer to display: time-dependent business reply markings, a variety of time-dependent barcodes and time-dependent notifications such as for limited time offers (e.g., 10% off until December 24th).

Upon a set date or time (preprogrammed into timer electronics such as a 555 integrated circuit, clock, or other timer the timing could be very precise and instantaneously switch desired pixels from black to white or from white to black), the display on the face of the envelope could be changed to display a courtesy reply envelope, changed barcodes and/or a different permanent offer to replace the time-dependent offer (e.g., free monogramming with $500 purchase).

In another alternative applicable as a substitute marking system to any of the illustrative embodiments herein, the "dark to light" conversions and "light to dark" conversions applicable to the described embodiments are achieved instead using microencapsulated dyes or inks such as those available in carbonless copy paper from NCR Corporation of Dayton, Ohio. A biodegradable microencapsulated black dye used with a "bleach" pair will change visible state from black to white over time. Furthermore, a biodegradable microencapsulated white dye used with a "developer" pair will change visible state from white to black over time. Accordingly, the combination described allows a dynamic marking that exhibits both color change states for use with the embodiments described herein. In this alternative, the system prints the white areas that are to turn black (e.g. barcode). The unprinted (untreated) white paper would remain white which is desirable. This alternative marking system may be subject to ambient conditions (turns faster in heat and light), and thus may be more advantageously used in bulk mail situations when delivery to the P&DC mat be controlled.

In any of the illustrative embodiments described herein, an optional grace period is employed such as to allow a biller to pay the applicable postage to accommodate a situation in which the time-dependent markings on the envelope flipped states just after the customer deposited the envelope in a mailbox.

In another alternative applicable to any of the illustrative embodiments herein, a mailing machine such as a Pitney Bowes DM SERIES mailing machine may be used to place the time-dependent marking using its internal inkjet printer. In yet another alternative applicable to any of the illustrative embodiments herein, a third party mail aggregator such as Pitney Bowes PSI may use such time-dependent barcodes in its presort operations.

In another alternative applicable to any of the illustrative embodiments herein, disappearing inks such as those described and referred to in U.S. Pat. No. 4,171,982, issued Oct. 23, 1979 to Lin may be utilized and such patent is incorporated herein by reference. Similarly, methods for determining formulations have appropriate reactive oxidations times are known and such methods may be used such as those described and referred to in U.S. Pat. No. 7,001,091 B1, issued Feb. 21, 2006 to Knight and U.S. Pat. No. 5,759,246, issued Jun. 2, 1998 to Frey, et al., such patents being incorporated herein by reference.

While illustrative embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description.

We claim:

1. A mail piece comprising:
a substrate,
at least one time-dependent machine readable ink marking on the substrate of the mail piece including a time-dependent machine readable barcode encoding postal information in the barcode,
wherein, the barcode has a first machine readable postal information value at a first period of time and a second, different machine readable postal information value after expiration of a second predetermined time period after the first period of time;
the at least one marking changes visible states after the second predetermined time period has expired after the first time period due to exposure of the at least one time dependent marking to air,
the barcode changing from having the first machine readable postal information value to the second machine readable postal information value after the expiration;
wherein machine reading of the barcode determines how the mail piece is to be processed, and
wherein the barcode comprises a reactive ink and oxidizing agent.

2. The mail piece of claim 1, wherein,
the barcode comprises at least one permanent marking portion and at least one time-dependent portion.

3. The mail piece of claim 2, wherein,
at least one of the at least one time-dependent marking portion is marked to cover at least one of the at least one permanent marking portion.

4. The mail piece of claim 1, wherein,
the barcode comprises delivery destination information, where the first value represents a first destination and the second value represents a second destination.

5. The mail piece of claim 1, wherein,
the barcode comprises delivery time information, where the first value represents a first time period and the second value represents a second time period.

6. The mail piece of claim 1, wherein,
the time-dependent marking has at least three visible states; and
the barcode has the second value during a second period of time and a third value after the second period of time.

7. The mail piece of claim 1, wherein,
the first period of time is approximately two days.

8. The mail piece of claim 1, further comprising:
a removable protective barrier film covering the at least one time-dependent marking.

9. A container holding perishable goods comprising:
an external container surface;
a first time-dependent machine readable ink marking on the surface including a barcode encoding information relating to the goods, a
second time-dependent machine readable ink marking on the surface, separate from the first time-dependent machine readable ink marking, including a barcode encoding perishable status information relating to the goods
wherein the first time-dependent machine readable ink marking provides a barcode during a first predetermined period of time and it does not provide a barcode due to the expiration of the first predetermined period of time; and
the second time-dependent machine readable ink marking does not provide a barcode during the first predetermined period of time and does provide a barcode due to the expiration of the first predetermined period of time,
wherein at least one of the first and second time-dependent markings comprises a reactive ink and oxidizing agent, and
wherein expiration of the first predetermined period of time results in the providing of the second time-dependent machine readable ink marking, and the not providing of the first time-dependent machine readable ink marking, and the expiration of the first predetermined period of time causes a change in the encoded perishable status information.

10. The container of claim 9, wherein,
at least one of the first and second time-dependent markings comprises an Azo group marking compound.

11. A substrate comprising:
a time-dependent marking including a machine readable barcode encoding information comprising a reactive ink disposed on the substrate
wherein, the machine readable barcode has a first machine readable information value at a first period of time and a second different machine readable information value after a predetermined amount of time has elapsed after the first period of time;
at least a first portion of the reactive ink changes visible state after the predetermined amount of time has elapsed after the first period of time causing a visible change to the time-dependent reactive ink machine readable barcode, wherein the visible change changes the first machine readable information value to the second machine readable information value, wherein the information values determine how the substrate is to be handled, and wherein the first portion of the reactive ink comprises an oxidation agent and a second portion of the reactive ink does not comprise an oxidation agent.

12. The substrate of claim 11, wherein, the reactive ink comprises an anthraquinone dye.

13. The substrate of claim 12, wherein, the anthraquinone dye comprises REACTIVE BLUE 4.

14. The substrate of claim 12, wherein, the anthraquinone dye comprises REACTIVE BLUE 19.

15. The substrate of claim 11, wherein, the reactive ink comprises an oxidation agent, and the time-dependent marking includes a second normal ink that does not comprise an oxidation agent.

16. The substrate of claim 11, wherein, the reactive ink comprises an Azo group marking compound.

17. The substrate of claim 11, wherein, the reactive ink comprises a catalyst.

* * * * *